US008688799B2

(12) United States Patent
Park

(10) Patent No.: US 8,688,799 B2
(45) Date of Patent: Apr. 1, 2014

(54) METHODS, APPARATUSES AND COMPUTER PROGRAM PRODUCTS FOR REDUCING MEMORY COPY OVERHEAD BY INDICATING A LOCATION OF REQUESTED DATA FOR DIRECT ACCESS

(75) Inventor: Keun-young Park, Mountain View, CA (US)

(73) Assignee: Nokia Corporation, Espoo (FI)

( * ) Notice: Subject to any disclaimer, the term of this patent is extended or adjusted under 35 U.S.C. 154(b) by 39 days.

(21) Appl. No.: 13/173,744

(22) Filed: Jun. 30, 2011

(65) Prior Publication Data

US 2013/0007197 A1  Jan. 3, 2013

(51) Int. Cl.
G06F 15/167 (2006.01)
(52) U.S. Cl.
USPC ......................................................... 709/212
(58) Field of Classification Search
USPC .................. 709/212, 213, 216, 230–237; 710/22–27, 52
See application file for complete search history.

(56) References Cited

U.S. PATENT DOCUMENTS

| 4,115,868 | A | * | 9/1978 | Suzuki et al. | 710/52 |
| 4,138,732 | A | * | 2/1979 | Suzuki et al. | 710/31 |
| 4,438,488 | A | * | 3/1984 | Shibayama et al. | 709/212 |
| 5,175,825 | A | * | 12/1992 | Starr | 709/213 |
| 5,721,828 | A | * | 2/1998 | Frisch | 709/217 |
| 5,867,661 | A | * | 2/1999 | Bittinger et al. | 709/227 |
| 6,061,796 | A | * | 5/2000 | Chen et al. | 726/15 |
| 6,654,807 | B2 | * | 11/2003 | Farber et al. | 709/225 |
| 6,832,239 | B1 | * | 12/2004 | Kraft et al. | 709/203 |
| 6,889,256 | B1 | * | 5/2005 | Palevich et al. | 709/229 |
| 6,889,266 | B1 | * | 5/2005 | Stadler | 710/22 |
| 6,983,325 | B1 | * | 1/2006 | Watson et al. | 709/228 |
| 7,149,817 | B2 | * | 12/2006 | Pettey | 709/250 |
| 7,370,082 | B2 | * | 5/2008 | Pinkerton | 709/212 |
| 7,543,037 | B2 | * | 6/2009 | Makhervaks et al. | 709/212 |
| 7,721,299 | B2 | * | 5/2010 | van Riel | 719/319 |
| 7,735,099 | B1 | * | 6/2010 | Micalizzi, Jr. | 719/328 |
| 7,921,178 | B2 | * | 4/2011 | Haviv | 709/212 |
| 7,937,449 | B1 |   | 5/2011 | Nath et al. | |

(Continued)

FOREIGN PATENT DOCUMENTS

WO    WO 98/52320 A2    11/1998
WO    WO 2006/104774 A2    10/2006

OTHER PUBLICATIONS

International Searching Authority, International Search Report and Written Opinion for International Application No. PCT/FI2012/050557, mailed Nov. 8, 2012, 12 pages, National Board of Patents and Registration of Finland, Finland.

*Primary Examiner* — Lance L Barry
(74) *Attorney, Agent, or Firm* — Alston & Bird LLP

(57) ABSTRACT

An apparatus for providing an efficient and reliable manner for transferring data via a network may include a processor and memory storing executable computer code causing the apparatus to at least perform operations including receiving a request for data from a device and enabling provision of information to a network stack. The information may include content indicating a location of the requested data for direct access by the network stack or a network driver, in response to receipt of the request. The computer program code may further cause the apparatus to enable provision of the requested data to the network driver, or enabling the network driver to retrieve the requested data, based at least in part on the indicated location of the requested data. Corresponding methods and computer program products are also provided.

20 Claims, 10 Drawing Sheets

(56) References Cited

U.S. PATENT DOCUMENTS

| | | | |
|---|---|---|---|
| 7,996,482 B1* | 8/2011 | Evans et al. | 709/212 |
| 8,180,842 B2* | 5/2012 | Hirai | 709/212 |
| 8,271,700 B1* | 9/2012 | Annem et al. | 710/26 |
| 2002/0087756 A1* | 7/2002 | Maessen | 710/52 |
| 2005/0038899 A1* | 2/2005 | Banerjee et al. | 709/231 |
| 2005/0210243 A1* | 9/2005 | Archard et al. | 713/160 |
| 2007/0033301 A1 | 2/2007 | Aloni et al. | |
| 2007/0162639 A1 | 7/2007 | Chu et al. | |
| 2008/0126369 A1 | 5/2008 | Ellard | |
| 2008/0229025 A1* | 9/2008 | Plamondon | 711/126 |
| 2010/0161750 A1 | 6/2010 | Pandya | |

\* cited by examiner

METHODS, APPARATUSES AND COMPUTER PROGRAM PRODUCTS FOR REDUCING MEMORY COPY OVERHEAD BY INDICATING A LOCATION OF REQUESTED DATA FOR DIRECT ACCESS

TECHNOLOGICAL FIELD

An example embodiment of the present invention relates generally to wireless and/or wired communication technology and more particularly, relates to an apparatus, method and a computer program product for facilitating an efficient and reliable mechanism of transferring data to one or more devices via a network(s).

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to services for transferring large amounts of data over a network.

For instance, currently, transferring large amounts of data over a network such as encoded videos, photos, Moving Picture Experts Group (MPEG) MPEG-2 Audio Layer III (MP3) files, and frame buffer data is quite common. One example of a large amount of data being transferred over a network relates to Virtual Network Computing (VNC) data. At present, VNC typically enables a graphical desktop to be shared remotely from one computer to another computer. For instance, VNC may relay graphical screen updates from one computer to another computer over a network. In this regard, VNC may typically be used to replicate a user interface of a VNC server to a display of a VNC client. In order to achieve a desirable user experience, a VNC server typically needs to transmit an entire frame buffer to a VNC client at a high frame rate. Transmitting large amounts of data from a VNC server to a VNC client typically consumes a number of computing resources. However, it may be beneficial to minimize processing load that may caused by a VNC server since the more processing load that a VNC server consumes, the less processing power a foreground application may be able to utilize.

Another example of a large amount of data being transferred over a network relates to Universal Plug and Play (UPnP) data. In this regard, an UPnP media server may be utilized to share and provide media such as music and video to UPnP clients. At present, UPnP media servers are supporting devices such as mobile phones, and it is becoming more beneficial to support such devices without consuming large amounts of processing power in order to reduce an undesirable impact on the existing software being executed in a system.

An additional example of a large amount of data being transferred over a network may relate to streaming data. For example, a web server streaming multiple videos simultaneously may require a large amount of data to be transferred across a network. If each stream causes too much processing capacity to be consumed, a processing load may limit the maximum number of streams a server may be able to support. However, decreasing processing load may result in better user experience or may increase the total capacity of a given server since large amounts of data transfer over a network typically consumes much power.

For instance, transmitting user interface frame data in a high frame rate or large media files may consume a lot of central processing unit (CPU) power such as, for example, sending Video Graphics Array (VGA) data of 30 fps over VNC may result in 36.9 MB/s of data traffic which may result in more than 24,500 Ethernet packets. Handling such large amounts of packets using the software based Transmission Control Protocol (TCP) and the Internet Protocol (IP) (TCP/IP) stack may be challenging, particularly for mobile systems with limited processing capability. The problem may become enhanced when such transmission is to occur in a background without affecting a foreground application. For example, CPU consumption of a VNC server or an UPnP media server executing in a background should be minimal to avoid affecting foreground applications being executed.

Naive transmission of data over a TCP/IP stack typically involves copying the data at least once from kernel space to a background server, and then the data is typically copied again to a TCP/IP stack. Due to the large amount of data being copied and transferred, a high quantity of processing capacity may be consumed.

In view of the foregoing drawbacks, it may be beneficial to provide a more efficient and reliable mechanism of transferring large amounts of data across a network that may reduce a quantity of computing resources for the data transfer.

BRIEF SUMMARY

A method, apparatus and computer program product are therefore provided that may enable an efficient and reliable manner for transferring data via a network. An example embodiment of the invention may reduce memory copy overhead associated with transmitting large amounts of data via a network to one or more devices. In this regard, some example embodiments may inform devices of an apparatus of the location in which requested data may be stored and may enable the devices to retrieve the data without copying the data in each instance of data retrieval in order to transfer requested data to one or more requesting devices.

An example embodiment may also enable removal of a memory copy altogether in instances in which direct access, to requested data, may be provided by a network driver. Some of the example embodiments may inform devices of the location of data being requested by one or more requesting devices and as such one or more of the devices involved in the retrieval of data for transfer may directly access the requested data from the location which may minimize the number of copies of the requested data prior to transfer of the requested data to the requesting devices. By minimizing the number of copies needed to enable transfer of requested data, some of the example embodiments may conserve processing and/or memory capacity of apparatuses (e.g., mobile devices, for example mobile phones, etc.).

In one example embodiment, a method for enabling transfer of data via a network is provided. The method may include receiving a request for data from a device and enabling provision of information to a network stack. The information may include content indicating a location of the requested data for direct access by the network stack or a network driver, in response to receipt of the request. The method may further include enabling provision of the requested data to the network driver, or enabling the network driver to retrieve the requested data. The provision of the requested data may be based at least in part on the indicated location of the requested data.

In another example embodiment, an apparatus for enabling transfer of data via a network is provided. The apparatus may include a processor and memory including computer program code. The memory and the computer program code are configured to, with the processor, cause the apparatus to at least perform operations including receiving a request for data from a device and enabling provision of information to a network stack. The information may include content indicating a location of the requested data for direct access by the network stack or a network driver, in response to receipt of the request. The computer program code may further cause the apparatus to enable provision of the requested data to the network driver, or enable the network driver to retrieve the requested data. The provision of the requested data may be based at least in part on the indicated location of the requested data.

In another example embodiment, a computer program product for enabling transfer of data via a network is provided. The computer program product includes at least one computer-readable storage medium having computer-executable program code portions stored therein. The computer-executable program code instructions may include program code instructions configured to facilitate receipt of a request for data from a device and enable provision of information to a network stack. The information may include content indicating a location of the requested data for direct access by the network stack or a network driver, in response to receipt of the request. The program code instructions may also be configured to enable provision of the requested data to the network driver, or enable the network driver to retrieve the requested data. The provision of the requested data may be based at least in part on the indicated location of the requested data.

An example embodiment of the invention may provide a better user experience since a device may more efficiently and reliably facilitate transfer of data to requesting devices. As a result, the device may conserve processing and/or memory resources and may perform with improved capabilities based on the conserved resources.

BRIEF DESCRIPTION OF THE SEVERAL VIEWS OF THE DRAWINGS

Figure 1A:
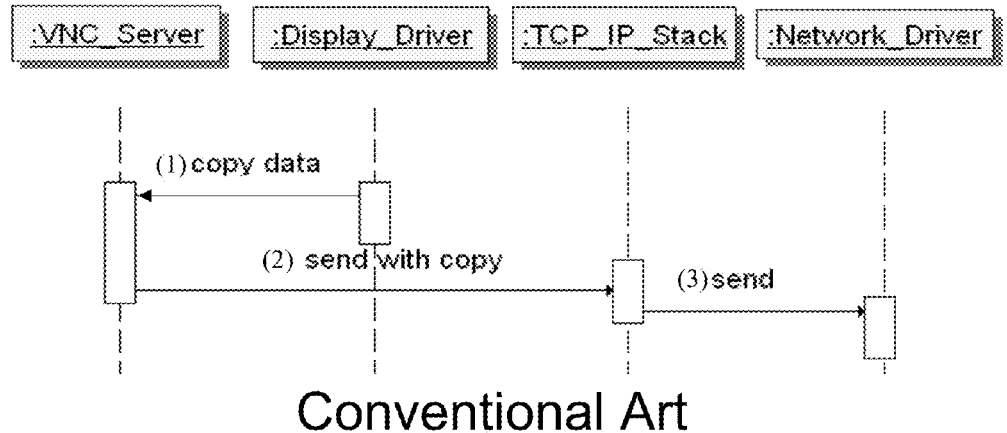
Figure 1B:
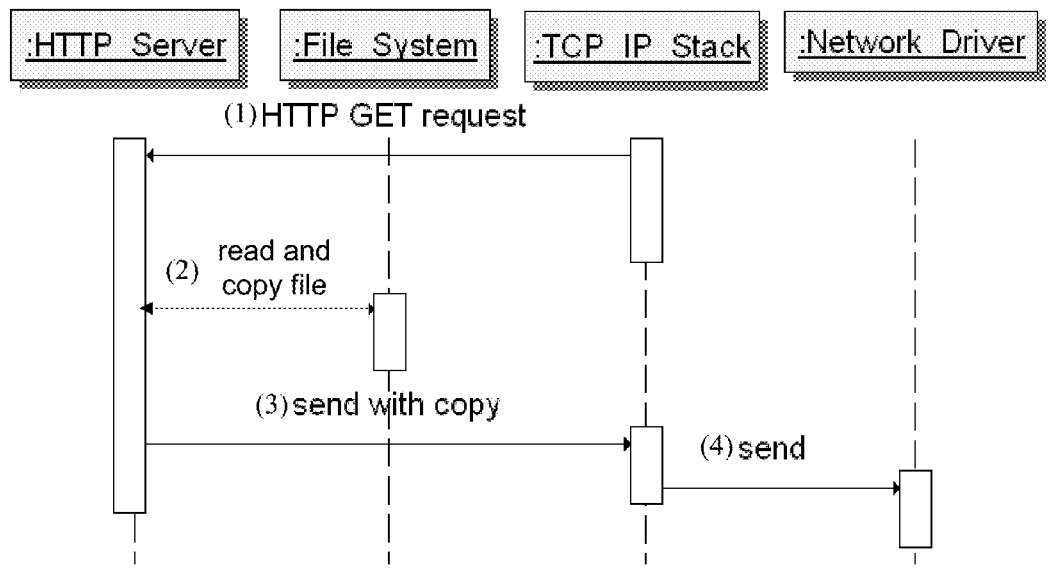
Figure 2:
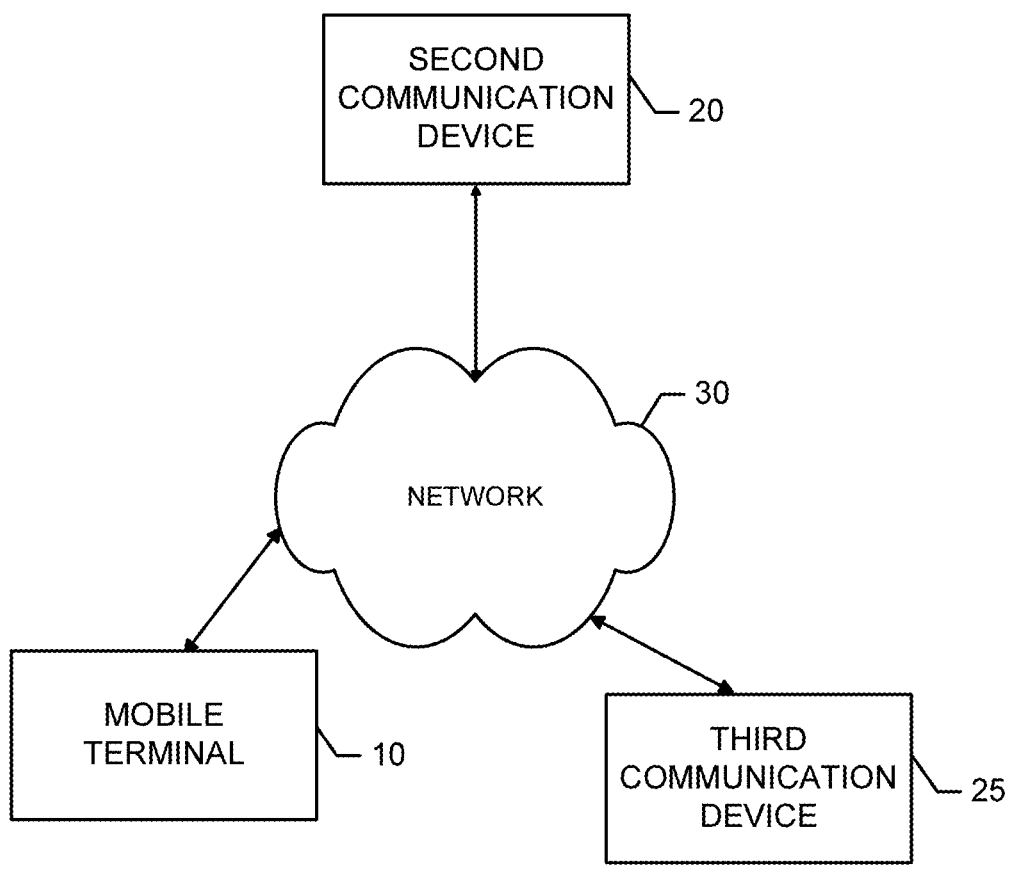
Figure 3:
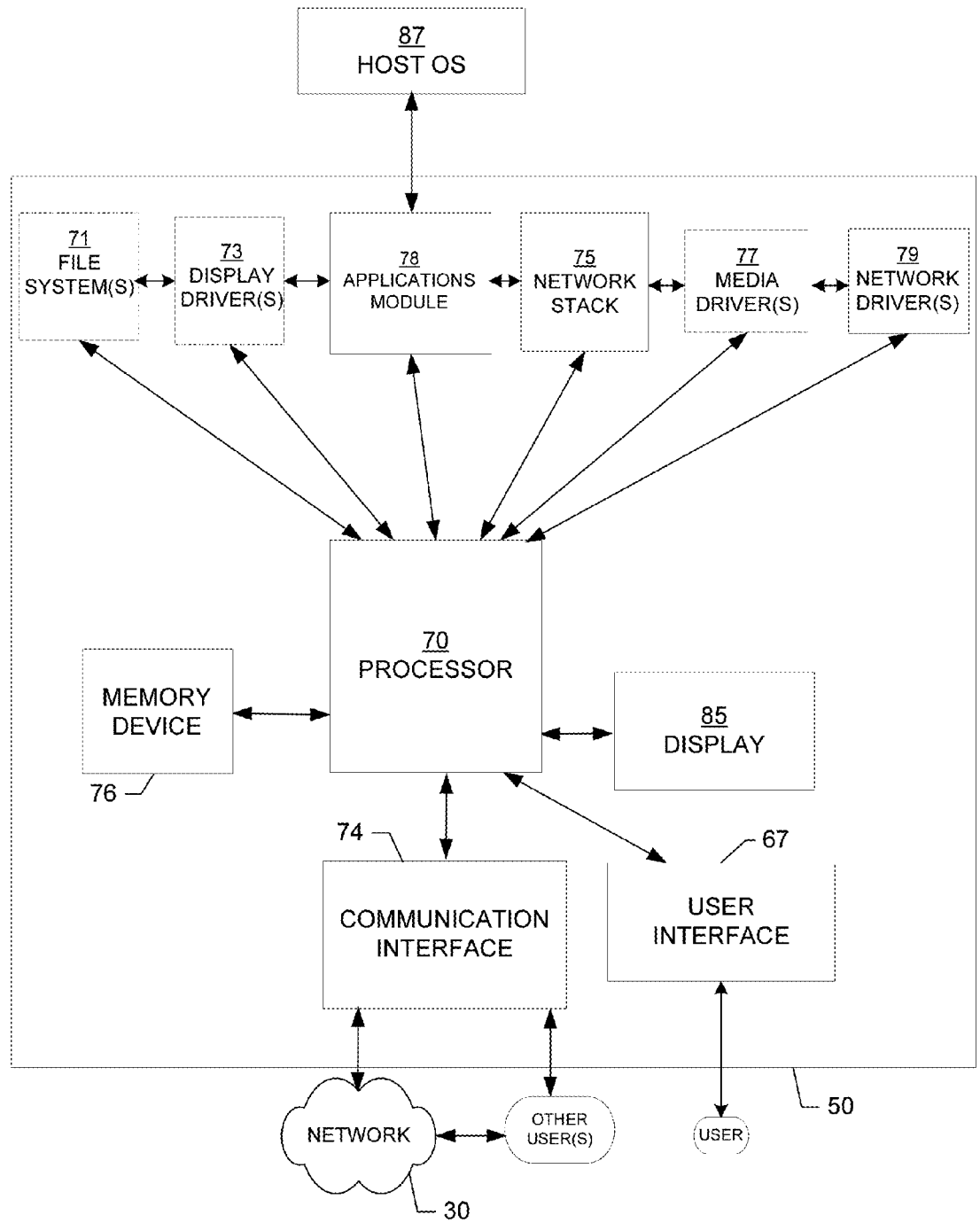
Figure 4A:
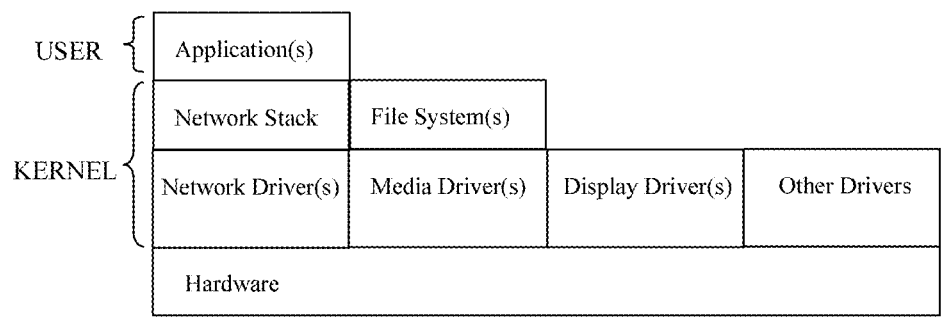
Figure 4B:
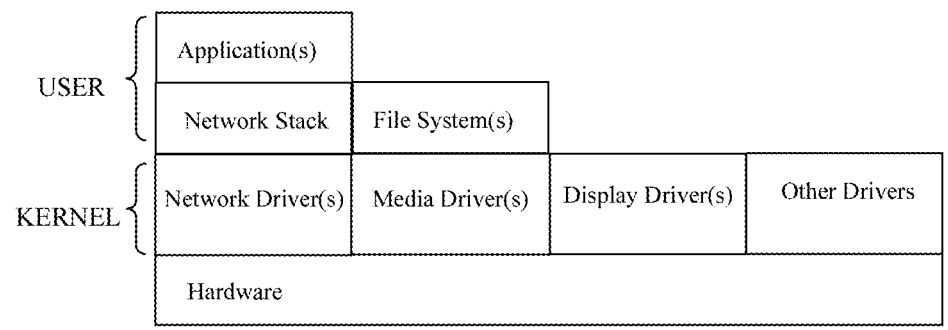
Figure 5:
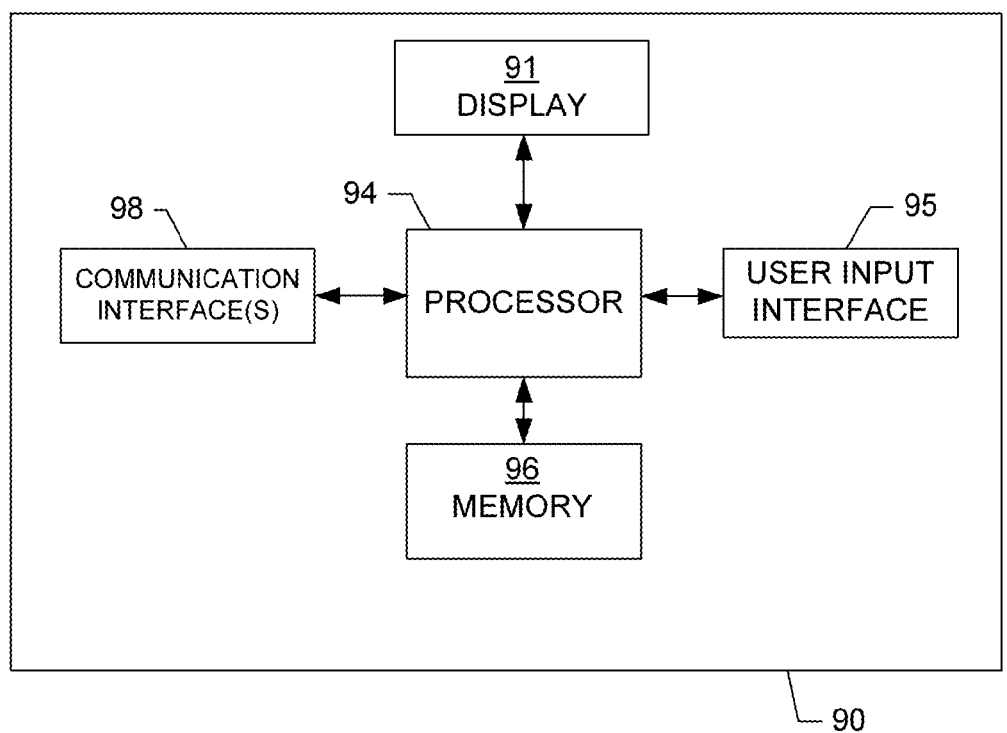
Figure 6:
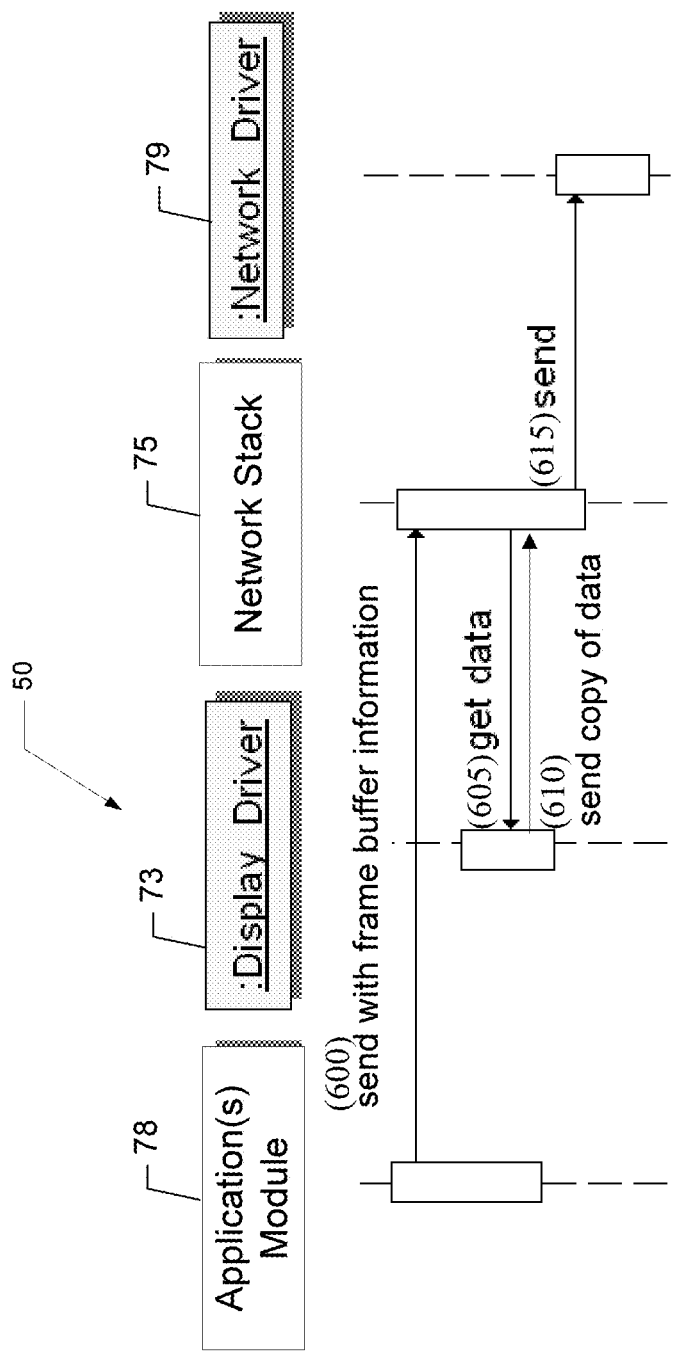
Figure 7A:
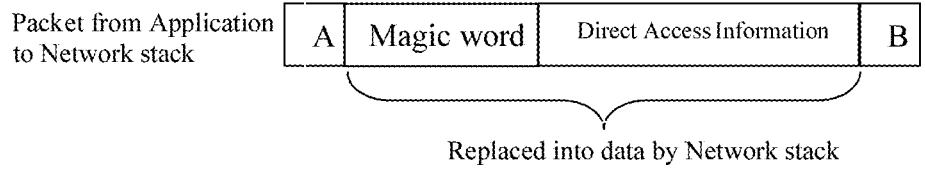
Figure 7B:
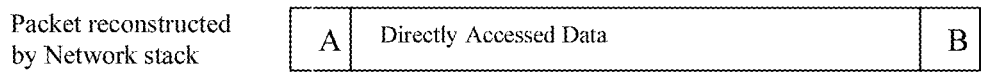
Figure 8A:
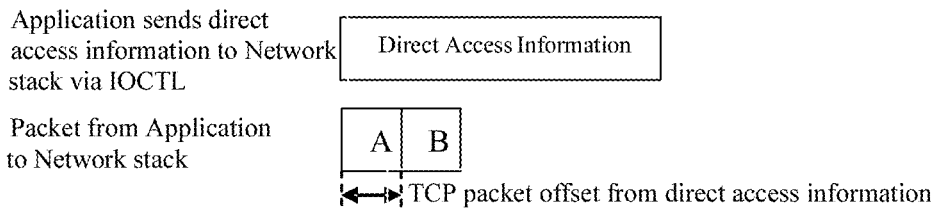
Figure 8B:
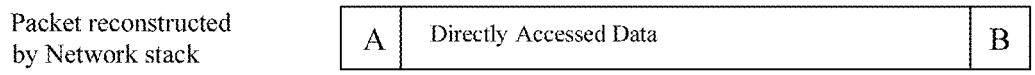
Figure 9:
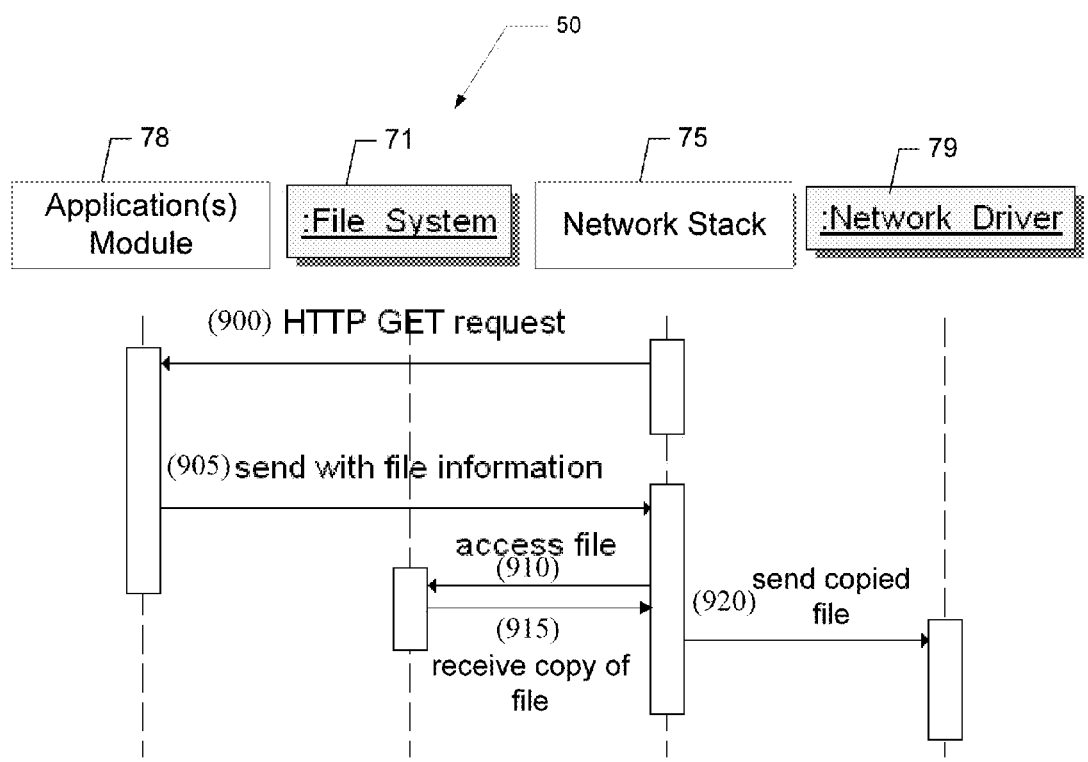
Figure 10:
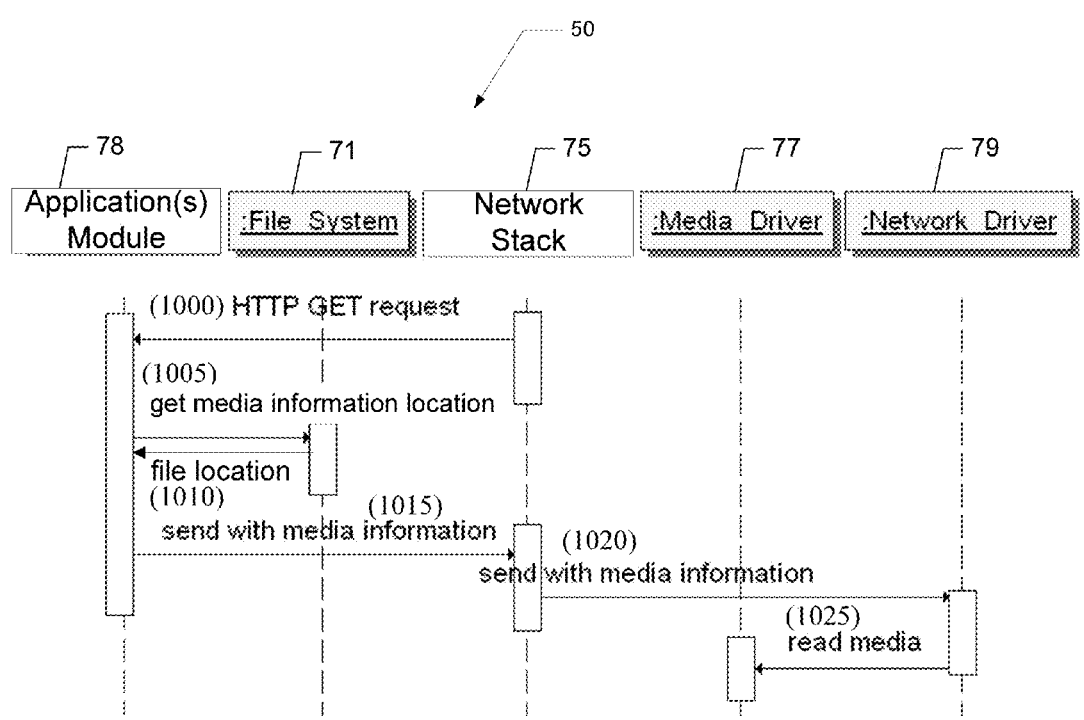
Figure 11:
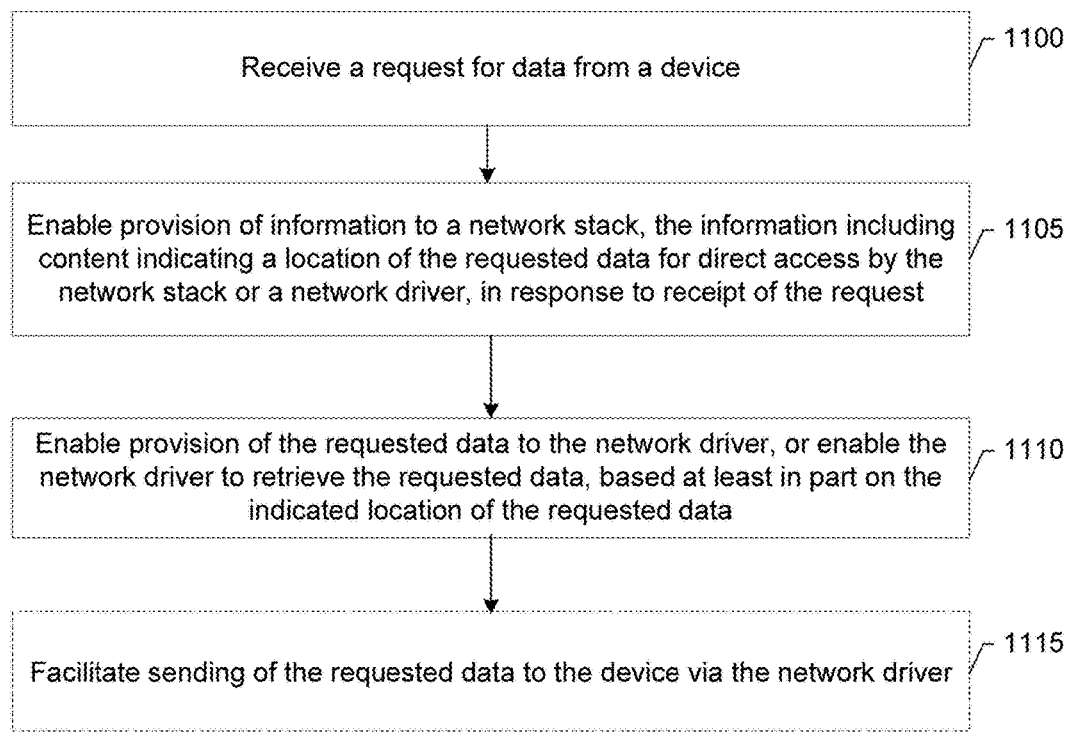

Having thus described the invention in general terms, reference will now be made to the accompanying drawings, which are not necessarily drawn to scale, and wherein:

FIG. 1A is a diagram illustrating a mechanism of a VNC server transmitting data to a device;

FIG. 1B is a diagram illustrating a mechanism of a HTTP server transmitting data to a device;

FIG. 2 is a schematic block diagram of a system according to an example embodiment of the invention;

FIG. 3 is a schematic block diagram of an apparatus according to an example embodiment of the invention;

FIG. 4A is a schematic block diagram of a monolithic kernel system according to an example embodiment of the invention;

FIG. 4B is a schematic block diagram of a micro kernel system according to an example embodiment of the invention;

FIG. 5 is a schematic block diagram of a communication device according to an example embodiment of the invention;

FIG. 6 is a schematic block diagram of an apparatus for enabling transfer of data via a network according to an example embodiment of the invention;

FIGS. 7A & 7B are diagrams of packets for transmitting direct access information indicating a location of requested data according to an example embodiment of the invention;

FIGS. 8A & 8B are diagrams of alternative packets for transmitting direct access information indicating a location of requested data according to an example embodiment of the invention;

FIG. 9 is a schematic block diagram of an apparatus for enabling transfer of data via a network according to another example embodiment of the invention;

FIG. 10 is a schematic block diagram of an apparatus for enabling transfer of data via a network according to another example embodiment of the invention; and FIG. 11 illustrates a flowchart for enabling transfer of data via a network according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Referring now to FIG. 1A, a schematic block diagram of a VNC server enabling copying and transfer of data is provided. In FIG. 1A, a client device may send a conventional VNC server a request for display data. In this regard, the VNC server may request the corresponding data from a device driver and the device driver typically copies the requested display data and sends it to the VNC server. See operation 1. Upon receipt of the copied display data from the display driver, the conventional VNC server generally makes another copy (e.g., a second copy) of the received display data and sends the copy of display data to the TCP IP stack. See operation 2. The TCP IP stack may make another copy of displayed data (e.g., a third copy) and may send this copy of the displayed data to a network driver. See operation 3. The network driver typically sends the received copy of the display data to the requesting client device. As such, existing VNC servers may require up to three copies of the same display data for sending to a client device. Such existing VNC servers may be inefficient and may consume more processing and memory resources than desirable.

Referring now to FIG. 1B, a schematic block diagram of a Hypertext Transfer Protocol (HTTP) server enabling copying and transfer of media data is provided. In FIG. 1B, a client device may send the conventional HTTP server a request for a media file. In this regard, the request may be received via the TCP IP stack and sent to the HTTP server via an HTTP GET request. See operation 1. In this regard, the HTTP server may request the corresponding media file from a file system and the file system may read the corresponding media file and make a copy (e.g., a first copy) of the read media file which may be sent to the HTTP server. See operation 2. Thereafter, the conventional HTTP server typically makes another copy (e.g., a second copy) of the previously copied media file and sends the copied media file to a TCP IP stack. See operation 3. The TCP IP stack may send the copied media file received from the HTTP server to the network device. See operation 4. The network device may send the copied media file to the requesting client device. In some instances, the TCP IP stack may also copy the media file received from the HTTP server and thereafter send the copied media file (e.g., a third copy) to the network driver for sending to the requesting client device. As such, existing HTTP servers may generate up to three copies of the same media data for sending to a client device. In this regard, existing HTTP servers are generally inefficient in providing media data to requesting client devices and may consume more processing and memory resources than desirable.

FIG. 2 illustrates a generic system diagram in which a device such as a mobile terminal 10 is shown in a communication environment according to some example embodiments. As shown in FIG. 2, a system in accordance with some example embodiments may include a first communication device (for example, mobile terminal 10) and a second communication device 20 capable of communication with each other via a network 30. In some cases, embodiments of the present invention may further include one or more additional communication devices, one of which is depicted in FIG. 2 as a third communication device 25. In some embodiments, not all systems that employ an embodiment of the present invention may comprise all the devices illustrated and/or described herein. While example embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) and/or Global Navigation Satellite System (GLONASS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 2 should be understood to be an example of a broad view of certain elements of the system and not an all inclusive or detailed view of the system or the network 30. According to some example embodiments the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. According to some example embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Wi-Fi Network, a Metropolitan Area Network (MAN), and/or a Wide Area Network (WAN), such as the Internet. In turn, other devices such as processing elements (for example, personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore the mobile terminal 10 and the second and third communication devices 20 and 25 may communicate in accordance with, for example, Universal Serial Bus (USB), Radio Frequency (RF), Cellular, Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

According to some example embodiments, the first communication device (for example, the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

According to some example embodiments, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

According to some example embodiments, the mobile terminal as well as the second and third communication devices 20 and 25 may employ an apparatus (for example, apparatus of FIG. 3) capable of functioning according to example embodiments of the invention. In some example embodiments, the second and third communication devices 20 and 25 may, but need not, be client devices (e.g., communication device 90 of FIG. 5). The communication devices 20 and 25 may request data from the mobile terminal 10 and/or from each other.

FIG. 3 illustrates a schematic block diagram of an apparatus for enabling an efficient and reliable manner for transfer of data via a network(s) according to some example embodiments. Some example embodiments of the invention will now be described with reference to FIG. 3, in which certain elements of an apparatus 50 are displayed. The apparatus 50 of FIG. 3 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, some embodiments of the invention may be embodied wholly at a single device (for example, the mobile terminal 10), by a plurality of devices in a distributed fashion (for example, on one or a plurality of devices in a P2P network) or by devices in a client/server relationship. Furthermore, it should be noted that the devices or elements described below may not be mandatory and thus some may be omitted in some embodiments.

Referring now to FIG. 3, the apparatus 50 may include or otherwise be in communication with a processor 70, a user interface 67, a communication interface 74, a memory device 76, a display 85, an optional file system(s) 71, an optional display driver(s) 73, an applications module 78, a network stack 75, an optional media driver(s) 77, a network driver(s) 79 and a host operating system (OS) 87. The OS 87 may coordinate some activities associated with the apparatus 50. For example, the OS 87 may coordinate activities for enabling transfer of data to one or more devices. In one example embodiment, the OS 87 may include a monolithic kernel architecture (e.g., the monolithic kernel architecture of FIG. 4A). In another alternative example embodiment, the OS 87 may include a micro kernel architecture (e.g., the micro kernel architecture of FIG. 4B). According to some example embodiments, the display 85 may be a touch screen display. The memory device 76 may include, for example, volatile and/or non-volatile memory. For example, the memory device 76 may be an electronic storage device (for example, a computer readable storage medium) comprising gates configured to store data (for example, bits) that may be retrievable by a machine (for example, a computing device like processor 70). In some embodiments, the memory device 76 may be a tangible memory device that is not transitory. The memory device 76 may be configured to store information, data, files, applications (e.g., Web applications (e.g., Hypertext Transfer Protocol (HTML) applications, etc.)), instructions or the like for enabling the apparatus to carry out various functions in accordance with example embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (for example, pictures, videos, graphical images of a desktop, etc.).

The apparatus 50 may, according to some example embodiments, be a mobile terminal (for example, mobile terminal 10) or a fixed communication device or computing device configured to employ example embodiments of the invention. According to some example embodiments, the apparatus 50 may be embodied as a chip or chip set. In other words, the apparatus 50 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 50 may therefore, in some cases, be configured to implement embodiments of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In some example embodiments, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile terminal or network device) adapted for employing embodiments of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser (e.g., Web browser) or the like. In this regard, the connectivity program may enable the apparatus 50 to transmit and receive Web content, such as for example location-based content or any other suitable content (e.g., applications), according to a Wireless Application Protocol (WAP) (e.g., an HTML Application Protocol), for example.

The communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In some example embodiments in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

The file system(s) 71 may be, or include, a memory (e.g., volatile and/or non-volatile memory), database or the like for storing and organizing collections of data, files (e.g., media files), folders, etc. that may be retrievable by the applications module 78, processor 70 and/or the OS 87. In one example embodiment, the file system(s) 71 may be stored in memory device 76. The display driver(s) 73 may be any means such as a device or circuitry embodied in either hardware or a combination of hardware and software that is configured to enable applications to interact with a hardware device such as, for example, a display, as described herein. In one example embodiment, the display driver 73 may be a graphics driver for a video card(s). The display driver 73 may store data (e.g., a graphical screen of a desktop, other display data, etc.) in a frame buffer for display (e.g., via display 85 or any other display (for example, an external display of a communication device). The frame buffer may, but need not, be a video output device that may drive a display from a memory buffer (e.g., memory device 76) storing one or more frames of data (e.g., one or more images, video data, etc.).

The network stack 75 may, for example, correspond to a set of communications protocols (e.g., Transmission Control Protocol (TCP) and the Internet Protocol (IP) (TCP/IP)) used for enabling communications across a network (e.g., network 30 (for example, the Internet). The media driver(s) 77 may be a hard disk memory for storing media files and any other suitable data. In one example embodiment, the hard disk memory corresponding to the media driver(s) 77 may be stored in memory device 76. The network driver(s) 79 may be any means such as a device or circuitry embodied in either hardware or a combination of hardware and software that is configured to activate the transmission and receipt of data over a network, as described herein.

In some example embodiments, the processor 70 may be embodied as, include or otherwise control the applications module 78. The applications module 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the applications module 78, as described below. Thus, in an example in which software is employed, a device or circuitry (for example, the processor 70 in one example) executing the software forms the structure associated with such means.

In an example embodiment, the applications module 78 be configured to operate/function as a server and may facilitate one or more requests for data received from one or more devices (for example, via a network). In one example embodiment, the applications module 78 may operate as a web server (e.g., a HTTP server) configured to deliver web pages, media files, documents (e.g., web documents, (e.g., HTML documents), images, videos, etc. that may be requested by one or more devices. The applications module 78 may deliver the requested data to one or more devices across a network (e.g., network 30 (e.g., the Internet)).

In another alternative example embodiment, the applications module 78 may be configured to operate/function as a VNC server. In this regard, the applications module 78 may facilitate sharing of one or more items of data (e.g., graphical items (for example, desktop items), accessing files on one device (e.g., a work computer) from another device (e.g., a user's home computer, etc.) between devices remotely from one device to another device. In this regard, in response to receipt of a request from one or more devices for one or more items, the applications module 78 may send the send the corresponding item(s) (e.g., a graphical screen of a display) to the requesting device over a network.

In an example embodiment, the applications module 78 may enable a reduced number of memory copies for transferring data to one or more devices based in part on reading data directly via the network stack 75 relating to the location of the requested data. In this regard, instead of sending copied data to a network stack 75, the applications module 78 may provide information specifying the location of the corresponding data being requested to the network stack 75 and the network stack 75 may, but need not, copy the corresponding data for sending to a requesting device via the network driver 79, as described more fully below. In this manner, the applications module 78 may reduce the number of copies for sending requested data to devices via a network and may conserve processing resources of the processor 70, for example and may also conserve memory capacity of one or more memory devices (e.g., memory device 76).

Referring now to FIGS. 4A and 4B, diagrams of operating systems according to some example embodiments are provided. In the example embodiment of FIG. 4A, a monolithic kernel architecture according to an example embodiment is provided. In this regard, the kernel (e.g., host OS 87) and the user space may be partitioned and a network stack (e.g., network stack 75 (e.g., a TCP/IP stack)) and a file system(s) (e.g., file system(s) 71) may belong to the kernel space. In the example embodiment of FIG. 4B, a partitioned micro kernel architecture (e.g., host OS 87) according to an example embodiment is provided. In the example embodiment of FIG. 4B, the network stack (e.g., network stack 75 (e.g., TCP/IP stack)) and the file system (e.g. file system(s) 71) may belong to the user space.

In the example embodiments of FIGS. 4A and 4B, the application(s) (e.g., applications module 78) may include but is not limited to servers such as, for example, a VNC server, a web server (e.g., a HTTP server, etc.) or any other suitable devices which may be executed in the user space, while hardware access may be performed in the kernel space by execution (for example, via execution of processor 70 of one or more device drivers (e.g., display driver(s) (e.g., display driver(s) 73), media driver(s) (e.g., media driver(s) 77), network driver(s) (e.g., network driver(s) 79), etc.).

In the example embodiment of FIG. 4A, a processor (e.g., processor 70) and/or the application(s) (e.g., applications module 78) being executed in the user space may facilitate one or more copies of data for transfer via a network based in part on communicating with the network stack and the file system(s) being executed in the kernel space. On the other hand, in the example embodiment of FIG. 4B, the application(s) (e.g., applications module 78) being executed in the user space may facilitate a copy of data for transfer via a network based in part on communicating with the network stack and the file system(s) also being executed in the user space and enabling communications with one or more of the drivers (e.g., network driver(s), media driver(s), display driver(s), other drivers, etc.) executing in the kernel space.

Referring now to FIG. 5, a block diagram of an example embodiment of a communication device is provided. As shown in FIG. 5, the communication device 90 (e.g., a network device (e.g., a server), a personal computer, a laptop computer, a wireless telephone, a mobile phone, etc.) generally includes a processor 94 and an associated memory 96. The memory 96 may comprise volatile and/or non-volatile memory, and may store content, data and/or the like. The memory 96 may store client applications, instructions, and/or the like for the processor 94 to perform the various operations of the communication device 90.

The processor 94 may also be connected to at least one communication interface 98 or other means for displaying, transmitting and/or receiving data, content, and/or the like. The user input interface 95 may comprise any of a number of devices allowing the network entity to receive data from a user, such as a keypad, a touch display 91, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like). In an example embodiment, the processor 94 may facilitate one or more communications with one or more devices (e.g., apparatuses 50). In this regard, the processor 94 may generate one or more requests for data (e.g., VNC data (e.g., graphical items of display), media files, etc.) that may be sent to one or more apparatuses 50. In response to receipt of the request, the applications module 78 and/or processor 70 may facilitate the retrieval of the requested data for sending to the communication device 90.

Referring now to FIG. 6, a diagram illustrating an efficient and reliable manner for transferring data via a network according to an example embodiment is provided. In the example embodiment of FIG. 6, an apparatus 50 may receive a request for data from a device such as, for example, communication device 90. In this example embodiment, the requested data may, but need not, relate to VNC data. For example, the request may relate to a request for a graphical display of another device (e.g., another communication device 90). However, it should be pointed out that the requested data may correspond to any suitable data (e.g., media files, images, video data, audio data, etc.) and is not limited to VNC data. The applications module 78 may function/operate as a VNC server, for example. In this regard, in response to receipt of the request, the applications module 78 may identify the location of the requested data (e.g., VNC data (e.g., a graphical display of another device)) and may send the network stack 75 a message indicating the location of the requested data (also referred to herein as frame buffer information). See operation 600. The message generated by the applications module 78 may also include data indicating the size of the data and may indicate the device (e.g., communication device 90) requesting the data. In addition, the message may include data instructing the network stack 75 to obtain the requested data from the location for sending to the requesting device (e.g., communication device 90).

In response to receipt of the message from the applications module 78, the network stack 75 (e.g., a TCP/IP stack) may obtain the requested data from a frame buffer of the display driver(s) 73 (or a frame buffer associated with the display driver(s) 73). In this regard, the network stack 75 may send a message to the display driver(s) 73 to obtain or get the requested data. See operation 605. In this regard, the display driver 73 may copy the requested data (e.g., VNC data (e.g., a graphical display of another device)) from the frame buffer and may send the copied data to the network stack 75. See operation 610. In response to receipt of the data (e.g., copied data) from the display driver(s) 73, the network stack 75 may, but need not, copy the received data and may send the copied data to the network driver(s) 79. See operation 615. In this regard, the network driver(s) 79 may send the data to the communication device 90 (e.g., the requesting device) that requested the data.

In an alternative example embodiment, a direct memory access (DMA) device controlled by the network driver(s) 79 may communicate directly with a frame buffer of the display driver 73 to read and retrieve the data without copying the data, in response to the network stack 75 sending a message to the network driver(s) 79 indicating that the location of requested data is in the frame buffer of the display driver(s) 73. As such, the network driver(s) 79 may send the data retrieved by the DMA to the requesting communication device 90. In this alternative example embodiment, the apparatus 50 may enable the requested data to be retrieved and sent to the requesting device by the network driver(s) 79 without copying the requested data.

By providing the location of requested data to a network stack (e.g., network stack 75), the applications module 78 of an example embodiment may enable a reduction in a number of times that requested data is copied for sending to a requesting device via a network. This reduction in copying data may conserve processing resources and memory resources of the apparatus 50.

The table below illustrates an example embodiment of a direct access information data structure of a message or packet that may be provided by the applications module 78 to the network stack 75 to provide information identifying the data that may be directly accessed by the network stack. In the table below, the Packet offset (e.g., TCP Packet offset) and the Width may be optional. In addition, the file handle, source offset, and length may be repeated multiple times to allow combining data from different files or drivers into a single packet.

| Member | Description |
| --- | --- |
| File handle | Unique identifier(s) for the file. This may be also used to uniquely identify non-file data like frame buffer or data from media like flash memory. |
| Source offset | This offset tells transmission should be done from which part of the file (or frame buffer) |
| Length | Size of file or frame buffer to transfer. |
| Packet offset (Optional) | The location of file (or frame buffer) data inside a packet (e.g., TCP packet) to send. This may be unnecessary if this structure is embedded into a packet from the applications module. |
| Width (Optional) | This may only be necessary for 2-D data like frame buffer data. It tells the width of the image(s) to transmit. |

The file handle may correspond to one or more unique identifiers indicating the location of data (e.g., VNC data, a media file(s), an image(s), etc.) being requested by a device (e.g., communication device 90). The unique identifiers may, but need not, be an address indicating the location of the data in a memory (e.g., frame buffer in a display driver or in a memory device 76)) or storage of a device. The source offset may identify which part or location of the data (e.g., a file) to retrieve for sending to a device. For purposes of illustration and not of limitation, a portion of requested data may be in a file having a size of 1,000 GB. However, the requested data may be 100 kB in size. As such, the source offset information may indicate to start retrieving data at the beginning location of the 100 kB of data being requested and stop retrieving data at the ending location of the 100 kB of the data being requested.

The length content of the data access information data structure may specify the length of the data being requested by a device. The length data may also indicate the size of the file or data in a frame buffer to transfer to a requesting device. The packet offset (e.g., TCP packet offset) may indicate the location of data, a file, frame buffer data, etc., inside a packet (e.g., a TCP packet) being sent by the applications module 78 to a network stack (e.g., network stack 75). The width content of the data access information data structure may specify the width of data or an image (e.g., two-dimensional (2D) data of a frame buffer) to transmit for a requesting device, for example.

Referring now to FIG. 7A, a diagram of an example embodiment of a packet for sending from an applications module to a network stack is provided. In the example embodiment of FIG. 7A, the applications module 78 (also referred to herein as application) may generate the packet (e.g., a TCP packet) such that it includes a word (also referred to herein as a magic word) denoting that direct access information (e.g., the information of the direct access information data structure of the table above) is being provided in the packet which may be different from other data (e.g., header A and/or trailer B) and/or different from a data structure of other data. The word, for example, may be a sequential string of characters (e.g., numbers). The word may also denote that the data following the word in the packet is direct access information indicating a location of data being requested by a device. Upon receipt of the packet, the network stack 75 may detect the presence of the data structure by checking all of the packet to search for the magic word characters (e.g., numbers) sequence, which may uniquely distinguish the data structure from other data.

Referring now to FIG. 7B, a diagram of another example embodiment of a packet for sending from a network stack to a network driver is provided. In the example embodiment of FIG. 7B, the network stack 75 may restructure the packet received from the applications module 78 to include the directly accessed data (e.g., the requested data (e.g., a graphical display of a desktop of another device, etc.)) that relates to the data requested by a device. In this regard, the network stack 75 may send the restructured packet to the network driver(s) 79 to enable the network driver(s) 79 to send the directly accessed data to the requesting device.

Referring now to FIG. 8A, a diagram of another example embodiment of a packet for sending from an applications module to a network stack is provided. In the example embodiment of FIG. 8A, the applications module 78 may generate a packet (e.g., TCP packet) to include direct access information identifying the location (e.g., a frame buffer of a display driver (e.g., display driver(s) 73)) of information (e.g., a media file) being requested by a device. The direct access information, as described above, for the whole packet may be sent by the applications module 78 to the network stack 75 via an Input Output Control (IOCTL) application programming interface (API) system call. In response to sending the packet with the direct access information, the applications module 78 may then send the header (e.g., header A) and trailer (e.g., trailer B) of the packet. In this regard, the trailer (e.g., trailer B) of the packet may be offset from the direct access information. By utilizing the IOCTL API system call to send the packet with the direct access information to the network stack 75, the network stack 75 may not need to detect the presence of direct access information by checking the entire packet data (e.g., the Direct Access Information, header A and trailer B) since there is no word (e.g., magic word) in the example embodiment of FIG. 8A. Since there is typically no overhead involved with checking the entire packet data sent from the applications module 78 to search for a word (e.g., magic word), the example embodiment of the packet sent via the IOCTL API system call of FIG. 8A may lead to better performance.

Referring now to FIG. 8B, a diagram of another example embodiment of a packet for sending from a network stack to a network driver is provided. In the example embodiment of FIG. 8B, the network stack 75 may restructure the packet received from the applications module 78 to include the directly accessed data (e.g., the requested data (e.g., a media file, etc.)) that relates to the data requested by a device. In this example embodiment, the network stack 75 may include the directly accessed data between the header A and the trailer B. The network stack 75 may send the restructured packet to network driver(s) 79 to enable the network driver(s) 79 to send the directly accessed data to the requesting device.

Referring to FIG. 9, a diagram illustrating an efficient and reliable mechanism for transferring data via a network according to an example embodiment is provided. In the example embodiment of FIG. 9, the applications module 78 may function/operate as a server such as, for example, a web server (e.g., a HTTP server). In the example embodiment of FIG. 9, an apparatus 50 may receive a request for data from a device such as, for example, communication device 90. In this example embodiment, the requested data may, but need not, relate to a file, for example. However, the requested data may relate to any other suitable data. In this example, the requesting device may send a request such as, for example, an HTTP GET request to the apparatus 50.

The network stack 75 may receive the request from the requesting device (e.g., communication device 90) and may send the request to the applications module 78. See operation 900. In response to receipt of the request, the applications module 78 may generate a message (e.g., a packet(s) (e.g., a packet(s) of FIG. 7A or 8A)) indicating the location of the requested data and may send this message to the network stack 75. See operation 905. The message generated by the applications module 78 may indicate that the location of the requested data (e.g., a file) is in the file system(s) 71. As such, the network stack 75 may directly access the corresponding file from the file system(s) 71. See operation 910. In an example embodiment, in an instance in which the network stack 75 may access the file, the file system(s) 71 may copy the corresponding file and send the copied file to the network stack 75. See operation 915. In response to receipt of the copied file, the network stack 75 may, but need not, generate another copy of the file and may send this copied file to the network driver(s) 79 to enable the network driver(s) 79 to send the copied file to the requesting device (e.g., communication device 90). See operation 920.

In an alternative example embodiment, a direct memory access (DMA) device controlled by the network driver(s) 79 may communicate directly with the file system(s) 71 to read and retrieve the data such as, for example, the file without copying the file, in response to the network stack 75 sending a message to the network driver 79 indicating that the location of requested data is in the file system(s) 71. As such, the network driver(s) 79 may send the data retrieved by the DMA to the requesting device (e.g., communication device 90). In this alternative example embodiment, the apparatus 50 may enable the requested data to be retrieved and sent to the requested device by the network driver(s) 79 without copying the requested data (e.g., the file).

Referring now to FIG. 10, a diagram illustrating an efficient and reliable mechanism for transferring data via a network according to an example embodiment is provided. In the example embodiment of FIG. 10, the applications module 78 may function/operate as a server such as, for example, a web server (e.g., a HTTP server). In the example embodiment of FIG. 10, an apparatus 50 may receive a request for data from a device such as, for example, communication device 90. The requested data may, but need not, relate to media information, for example. However, the requested data may relate to any other suitable data without departing from the spirit and scope of the invention. The requesting device requesting the media information may send a request such as, for example, a HTTP GET request to the apparatus 50.

The request (e.g., HTTP GET request) may be received from the requesting device by the network stack 75 which may send the request to the applications module 78. See operation 1000. In this regard, the applications module 78 may send the file system(s) 71 a message indicating that the applications module 78 would like to get or obtain the location of the requested media information. See operation 1005. In response to receipt of the message from the applications module 78, the file system(s) 71 may send a message to the applications module 78 indicating the location of the requested media information (also referred to herein as file location). See operation 1010. In the example embodiment of FIG. 10, the file system(s) 71 may include information in the message indicating that the requested media information is located on a hard disk of the media driver(s) 77. In response to receipt of the message from the file system(s) 71 indicating the location of the requested media information, the applications module 78 may generate a message and may send the message to the network stack 75 indicating the location of the requested media information. See operation 1015. The message may correspond to a packet(s) including direct access information (e.g., packet(s) of FIG. 7A or 8A). In this regard, the network stack 75 may send a message to the network driver(s) 79 indicating the location of the requested media information for direct access by the network driver(s) 79. See operation 1020. In this manner, the network driver(s) 79 may directly access and read the requested media information of the hard disk of the media driver(s) 77. See operation 1025. In response to reading and accessing the requested media information from the hard disk of the media driver(s) 77, the network driver(s) 79 may send the requested media information to the requesting device (e.g., communication device 90). Since the network driver(s) 79 of the example embodiment of FIG. 10 may read the file data directly from the media driver(s) 77, the example embodiment of the apparatus 50 of FIG. 10 may not need to copy the requested media information. In this regard, processing resources and/or memory capacity resources of the apparatus 50 may be conserved and the apparatus 50 may operate more efficiently.

Referring now to FIG. 11, an example embodiment of a flowchart for providing an efficient and reliable manner for transferring data via a network is provided. At operation 1100, an apparatus (e.g., applications module 78) may receive a request (e.g., an HTTP GET request) for data (e.g., VNC data, a media file, an image(s), etc.) from a device (e.g., communication device 90). At operation 1105, an apparatus (e.g., applications module 78) may enable provision of information to a network stack (e.g., network stack 75). The information may include content indicating a location (e.g., a frame buffer associated with a display driver(s) 73, a memory of a file system(s) 71, etc.) of the requested data for direct access by the network stack or a network driver (e.g., network driver(s) 79), in response to receipt of the request.

At operation 1110, an apparatus (e.g., applications module 78) may enable provision of the requested data to the network driver, or enable the network driver to retrieve the requested data, based at least in part on the indicated location of the requested data. Optionally, at operation 1115, an apparatus may facilitate sending of the requested data to the device (e.g., communication device 90), via the network driver.

It should be pointed out that FIG. 11 is a flowchart of a system, method and computer program product according to some example embodiments of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in some example embodiments, the computer program instructions which embody the procedures described above are stored by a memory device (for example, memory device 76, memory 96) and executed by a processor (for example, processor 70, processor 94, applications module 78). As will be appreciated, any such computer program instructions may be loaded onto a computer or other programmable apparatus (for example, hardware) to produce a machine, such that the instructions which execute on the computer or other programmable apparatus cause the functions specified in the flowchart blocks to be implemented. In some example embodiments, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, an apparatus for performing the method of FIG. 11 above may comprise a processor (for example, the processor 70, the processor 94, the applications module 78) configured to perform some or each of the operations (1100-1115) described above. The processor may, for example, be configured to perform the operations (1100-1115) by performing hardware implemented logical functions, executing stored instructions, or executing algorithms for performing each of the operations. Alternatively, the apparatus may comprise means for performing each of the operations described above. In this regard, according to some example embodiments, examples of means for performing operations (1100-1115) may comprise, for example, the processor 70 (for example, as means for performing any of the operations described above), the applications module 78, the processor 94 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a request for data from a device;
   enabling provision of information to a network stack, the information comprising content indicating a location of the requested data for direct access by the network stack, in response to receipt of the request; and
   enabling, via a processor, provision of the requested data to a network driver, or enabling the network driver to retrieve the requested data, based at least in part on the indicated location of the requested data.

2. The method of claim 1, further comprising:
   facilitating sending of the requested data to the device via the network driver.

3. The method of claim 1, wherein the content indicating the location comprises data denoting that the location corresponds to at least one of a frame buffer associated with a device driver, a memory of a file system or a hard disk of a media driver.

4. The method of claim 1, wherein enabling provision of the requested data comprises generating a copy of the requested data and facilitating sending of the copy of the requested data to the network stack.

5. The method of claim 4, wherein generating the copy comprises generating a first copy of the requested data at the location, wherein the method further comprises:
   enabling the network stack to obtain the first copy of the requested data;
   generating a second copy of the requested data via the network stack; and
   facilitating sending of the second copy of the requested data to the network driver to enable the network driver to facilitate provision of the second copy of the requested data to the device.

6. The method of claim 1, wherein enabling the network driver to retrieve the requested data comprises enabling a direct access memory of the network driver to retrieve the requested data at the location from a memory associated with a driver or a file system.

7. The method of claim 1, wherein enabling the network device to retrieve the requested data comprises enabling the network device to directly access and obtain the requested data at the location and the method further comprises:
   facilitating sending of the requested data to the device via the network driver.

8. The method of claim 1, wherein prior to enabling provision of the information, the method further comprises:
   generating at least one packet comprising the information;
   enabling the network stack to restructure the information of the packet to obtain another packet in response to receipt of the packet, the restructure of the information is based in part on reconfiguring the information indicating the direct access corresponding to the location specified in the packet; and
   enabling provision of the another packet to the network driver to enable the network driver to facilitate sending of the requested data to the device.

9. An apparatus comprising:
   at least one processor; and
   at least one memory including computer program code configured to, with the at least one processor, cause the apparatus to perform at least the following:
   receive a request for data from a device;

enable provision of information to a network stack, the information comprising content indicating a location of the requested data for direct access by the network stack, in response to receipt of the request; and enable provision of the requested data to a network driver, or enable the network driver to retrieve the requested data, based at least in part on the indicated location of the requested data.

10. The apparatus of claim 9, wherein the memory and computer program code are configured to, with the processor, cause the apparatus to:

facilitate sending of the requested data to the device via the network driver.

11. The apparatus of claim 9, wherein the content indicating the location comprises data denoting that the location corresponds to at least one of a frame buffer associated with a device driver, a memory of a file system or a hard disk of a media driver.

12. The apparatus of claim 9, wherein the memory and computer program code are configured to, with the processor, cause the apparatus to:

enable provision of the requested data by generating a copy of the requested data; and facilitate sending of the copy of the requested data to the network stack.

13. The apparatus of claim 12, wherein generating the copy comprises generating a first copy of the requested data at the location, and wherein the memory and computer program code are configured to, with the processor, cause the apparatus to:

enable the network stack to obtain the first copy of the requested data;

generate a second copy of the requested data via the network stack; and facilitate sending of the second copy of the requested data to the network driver to enable the network driver to facilitate provision of the second copy of the requested data to the device.

14. The apparatus of claim 9, wherein the memory and computer program code are configured to, with the processor, cause the apparatus to:

enable the network driver to retrieve the requested data by enabling a direct access memory of the network driver to retrieve the requested data at the location from a memory associated with a driver or a file system.

15. The apparatus of claim 9, wherein the memory and computer program code are configured to, with the processor, cause the apparatus to:

enable the network device to retrieve the requested data by enabling the network device to directly access and obtain the requested data at the location; and facilitate sending of the requested data to the device via the network driver.

16. The apparatus of claim 9, wherein prior to enable provision of the information, the memory and computer program code are configured to, with the processor, cause the apparatus to:

generate at least one packet comprising the information;

enable the network stack to restructure the information of the packet to obtain another packet in response to receipt of the packet, the restructure of the information is based in part on reconfiguring the information indicating the direct access corresponding to the specified location in the packet; and enable provision of the another packet to the network driver to enable the network driver to facilitate sending of the requested data to the device.

17. A computer program product comprising at least one non-transitory computer-readable storage medium having computer-readable program code portions stored therein, the computer-readable program code portions comprising:

program code instructions configured to facilitate receipt of a request for data from a device;

program code instructions configured to enable provision of information to a network stack, the information comprising content indicating a location of the requested data for direct access by the network stack, in response to receipt of the request; and program code instructions configured to enable provision of the requested data to a network driver, or enabling the network driver to retrieve the requested data, based at least in part on the indicated location of the requested data.

18. The computer program product of claim 17, further comprising:

program code instructions configured to facilitate sending of the requested data to the device via the network driver.

19. The computer program product of claim 17, wherein the content indicating the location comprises data denoting that the location corresponds to at least one of a frame buffer associated with a device driver, a memory of a file system or a hard disk of a media driver.

20. The computer program product of claim 17, further comprising:

program code instructions configured to enable provision of the requested data to the network driver by generating a copy of the requested data; and program code instructions configured to facilitate sending of the copy of the requested data to the network stack.

* * * * *